United States Patent
Balon et al.

(10) Patent No.: US 11,661,861 B2
(45) Date of Patent: May 30, 2023

(54) BI-METAL VARIABLE GEOMETRY TURBOCHARGER VANES AND METHODS FOR MANUFACTURING THE SAME USING LASER CLADDING

(71) Applicant: Garrett Transportation I Inc, Torrance, CA (US)

(72) Inventors: Petr Balon, Pozorice (CZ); Philippe Renaud, Sanchey (FR)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 17/249,480

(22) Filed: Mar. 3, 2021

(65) Prior Publication Data
US 2022/0282636 A1    Sep. 8, 2022

(51) Int. Cl.
| | | |
|---|---|---|
| *F01D 17/16* | (2006.01) | |
| *B23K 26/342* | (2014.01) | |
| *B32B 1/00* | (2006.01) | |
| *B32B 15/01* | (2006.01) | |
| *F01D 9/04* | (2006.01) | |
| *F04D 29/44* | (2006.01) | |
| *B23K 101/00* | (2006.01) | |

(52) U.S. Cl.
CPC .......... *F01D 17/165* (2013.01); *B23K 26/342* (2015.10); *B32B 1/00* (2013.01); *B32B 15/015* (2013.01); *F01D 9/041* (2013.01); *F04D 29/444* (2013.01); *B23K 2101/001* (2018.08); *B32B 2250/02* (2013.01); *B32B 2603/00* (2013.01); *F05D 2220/40* (2013.01); *F05D 2230/13* (2013.01); *F05D 2230/60* (2013.01); *F05D 2240/12* (2013.01); *F05D 2300/17* (2013.01)

(58) Field of Classification Search
CPC ...... F01D 17/16; F01D 17/162; F01D 17/165; F04D 29/444; F02C 9/20; F05D 2220/40; Y10T 10/144
See application file for complete search history.

(56) References Cited

U.S. PATENT DOCUMENTS

| | | | |
|---|---|---|---|
| 4,371,312 A * | 2/1983 | Tank | C22C 32/0026 29/889.7 |
| 6,154,959 A | 12/2000 | Goodwater et al. | |
| 7,712,311 B2 | 5/2010 | Ren et al. | |
| 8,083,474 B2 * | 12/2011 | Hashimoto | F01D 17/165 415/164 |
| 8,790,789 B2 | 7/2014 | Ramgopal et al. | |
| 9,080,454 B2 | 7/2015 | Coupe et al. | |
| 9,272,365 B2 | 3/2016 | Bruck et al. | |
| 9,289,854 B2 | 3/2016 | Bruck et al. | |

(Continued)

FOREIGN PATENT DOCUMENTS

| | | |
|---|---|---|
| CN | 102127762 A | 7/2011 |
| CN | 103122459 A | 5/2013 |

(Continued)

*Primary Examiner* — Topaz L. Elliott
(74) *Attorney, Agent, or Firm* — Quinn IP Law (57) ABSTRACT

A bi-metal variable geometry turbocharger (VGT) vane includes a structural, airfoil-shaped flag portion, and a functional, cylindrically-shaped shaft portion connected to the flag portion. The flag portion and the shaft portion are formed of a first metal alloy, and the shaft portion further includes a surface area formed of a second metal alloy different from the first metal alloy.

19 Claims, 5 Drawing Sheets

(56) References Cited

U.S. PATENT DOCUMENTS

| | | | |
|---|---|---|---|
| 9,322,313 B2 | 4/2016 | Yokoyama | |
| 9,587,557 B2 | 3/2017 | Barron et al. | |
| 10,287,902 B2* | 5/2019 | Sak | F01D 9/041 |
| 2004/0091639 A1* | 5/2004 | Giannozzi | C23C 24/10 |
| | | | 420/440 |
| 2005/0008489 A1* | 1/2005 | Perruchaut | F04D 29/563 |
| | | | 416/160 |
| 2005/0011192 A1 | 1/2005 | Ohishi | |
| 2005/0178750 A1 | 8/2005 | Ang et al. | |
| 2006/0029494 A1* | 2/2006 | Bruce | F04D 29/023 |
| | | | 415/160 |
| 2006/0134455 A1* | 6/2006 | Belhadjhamida | B05D 3/0254 |
| | | | 428/668 |
| 2006/0179838 A1* | 8/2006 | Nakagawa | F01D 17/165 |
| | | | 60/602 |
| 2008/0226843 A1 | 9/2008 | Fukubayashi et al. | |
| 2010/0028142 A1* | 2/2010 | Hashimoto | F02C 6/12 |
| | | | 415/200 |
| 2012/0279631 A1 | 11/2012 | Mizokami et al. | |
| 2016/0146037 A1* | 5/2016 | Scott | F02B 37/24 |
| | | | 415/148 |
| 2016/0221122 A1 | 8/2016 | D'Orlando et al. | |
| 2016/0312622 A1 | 10/2016 | Burbaum et al. | |
| 2017/0009592 A1 | 1/2017 | Obuchi et al. | |
| 2017/0145912 A1* | 5/2017 | Micanek | F01D 17/165 |
| 2019/0368051 A1 | 12/2019 | Kulkarni et al. | |
| 2022/0152702 A1* | 5/2022 | Murukesan | C22C 33/0285 |

FOREIGN PATENT DOCUMENTS

| | | | | |
|---|---|---|---|---|
| CN | 104385703 A | 3/2015 | | |
| CN | 104532233 A | 4/2015 | | |
| CN | 105349995 A | 2/2016 | | |
| CN | 105483697 A | 4/2016 | | |
| CN | 105506616 A | 4/2016 | | |
| CN | 206682140 U | 11/2017 | | |
| CN | 108034940 A | 5/2018 | | |
| CN | 108165986 A | 6/2018 | | |
| CN | 108544238 S | 9/2018 | | |
| CN | 109252160 A | 1/2019 | | |
| CN | 109338358 A | 2/2019 | | |
| CN | 110484910 A | 11/2019 | | |
| DE | 102011100456 B4 | 5/2015 | | |
| EP | 0925844 A2 | 6/1999 | | |
| EP | 1403398 A2 | 3/2004 | | |
| EP | 1640626 A1 | 3/2006 | | |
| EP | 1717346 A2 | 11/2006 | | |
| EP | 2343441 B1 | 12/2015 | | |
| EP | 3170991 A1 | 5/2017 | | |
| EP | 2785491 B1 | 5/2019 | | |
| EP | 4000764 A1 | 5/2022 | | |
| GB | 2536399 A | * | 9/2016 | F01D 17/14 |
| JP | 2007023843 A | * | 2/2007 | B05D 3/0254 |
| JP | 2013019324 A | 1/2013 | | |
| JP | 2017214892 A | 12/2017 | | |
| KR | 101107596 B1 | 1/2012 | | |
| WO | 2012152461 A1 | 11/2012 | | |
| WO | WO-2013079193 A1 | * | 6/2013 | B23K 26/32 |
| WO | 2019243418 A1 | 12/2019 | | |
| WO | 2022017563 A1 | 1/2022 | | |

* cited by examiner

BI-METAL VARIABLE GEOMETRY TURBOCHARGER VANES AND METHODS FOR MANUFACTURING THE SAME USING LASER CLADDING

TECHNICAL FIELD

The present disclosure generally relates to turbocharger components and methods for manufacturing turbocharger components. More particularly, the present disclosure relates to bi-metal variable geometry turbocharger vanes and methods for manufacturing bi-metal turbocharger vanes using laser cladding techniques.

BACKGROUND

Turbochargers for gasoline and diesel internal combustion engines are devices known in the art that are used for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing. The exhaust gas-driven turbine is mounted onto one end of a shaft that is common to a radial air compressor mounted onto an opposite end of the shaft and housed in a compressor housing. Thus, rotary action of the turbine also causes the air compressor to spin within a compressor housing of the turbocharger that is separate from the turbine housing. The spinning action of the air compressor causes intake air to enter the compressor housing and be pressurized or boosted a desired amount before it is mixed with fuel and combusted within the engine combustion chamber.

In a turbocharger it is often desirable to control the flow of exhaust gas to the turbine to improve the efficiency or operational range of the turbocharger. Variable geometry turbochargers (VGTs) have been configured to address this need. A type of such VGT is one having a variable exhaust nozzle, referred to as a variable nozzle turbocharger (VNT). Different configurations of variable nozzles have been employed to control the exhaust gas flow. One approach taken to achieve exhaust gas flow control in such VGTs involves the use of multiple pivoting vanes that are positioned annularly around the turbine inlet. The pivoting vanes are commonly controlled to alter the throat area of the passages between the vanes, thereby functioning to control the exhaust gas flow into the turbine.

The pivoting vanes may be thought of as having "functional" portions and "structural portions". As used herein, the functional portions refer to those portions that are used to cause the pivoting action of the vane, and typically include some or all of a cylindrical shaft of the vane that does not extend into the airflow path, but is subject to high-temperature wearing due to tribological effects as the shaft rotates within its housing. Further, as used herein, the structural portions refer to those portions that are directly within the airflow path and direct the flow of air, and typically include an airfoil shaped member commonly referred to as a flag. The use herein of the terms "functional" and "structural" are not intended to be limiting in any sense on the operational characteristics of any vane; rather, they are merely used herein for ease of description and reference to certain components/portions of an exemplary vane.

Many VGT turbocharger vanes are made using stainless steel alloys (an illustrative example is HK 30 stainless steel) or nickel-chromium superalloys (an illustrative example is the family of Inconel nickel-chromium superalloys). Such stainless steels are fully austenitic and is alloyed primarily with chromium and nickel, and are suitable for temperatures up to about 1020° C. Such nickel-chromium superalloys are composed of a majority nickel, alloyed with chromium and iron, and is suitable for temperatures up to about 1050° C. Due to their positioning around the turbine inlet, the pivoting vanes are subjected to very hot exhaust gasses, often in excess of 980° C. and higher. These high temperature applications, however, pose a potential wear risk to high-strength, corrosion-resistant stainless steel materials (such as the aforementioned HK 30 example) or to nickel-chromium superalloy materials (such as the aforementioned Inconel example), especially on the functional portions. Other specialty alloys are known in the art, but these materials are generally more expensive that the stainless steel alloy or nickel-chromium superalloys materials noted above, and would pose significant cost (as well as manufacturing) challenges if the entirety of the vanes (both the functional and structural portions) were fabricated from these materials.

Accordingly, it would be desirable to provide variable nozzle turbine vanes for turbocharger applications that can resist wear at their functional portions during elevated temperature operations. Furthermore, it would be desirable to provide such variable nozzle turbine vanes for turbocharger applications that are not excessively expensive due to the use of specialty materials for an entirety of the vanes. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Bi-metal variable geometry turbocharger vanes and methods for manufacturing bi-metal turbocharger vanes using laser cladding techniques are disclosed herein.

In an exemplary embodiment, disclosed is a bi-metal variable geometry turbocharger (VGT) vane that includes a structural, airfoil-shaped flag portion, and a functional, cylindrically-shaped shaft portion connected to the flag portion. The flag portion and the shaft portion are formed of a first metal alloy, and the shaft portion further includes a surface area formed of a second metal alloy different from the first metal alloy.

In another exemplary embodiment, disclosed is method for manufacturing a bi-metal variable geometry turbocharger (VGT) vane that includes the step of providing or obtaining an untreated VGT vane. The untreated VGT vane includes a structural, airfoil-shaped flag portion, and a functional, cylindrically-shaped shaft portion connected to the flag portion. The flag portion and the shaft portion are formed of a first metal alloy. The method further includes the step of subjecting the shaft portion to a laser cladding process using a second metal alloy different from the first metal alloy, thereby forming a surface area of the second metal on the shaft portion.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWING

The inventive subject matter will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Unless specifically stated or obvious from context, as used herein, the term "about" is understood as within a range of normal tolerance in the art, for example within 2 standard deviations of the mean. "About" can be understood as within 10%, 5%, 1%, 0.5%, 0.1%, 0.05%, or 0.01% of the stated value. "About" can alternatively be understood as implying the exact value stated. Unless otherwise clear from the context, all numerical values provided herein are modified by the term "about."

The present disclosure is generally directed to bi-metal variable geometry turbocharger vanes and methods for manufacturing bi-metal turbocharger vanes using laser cladding techniques. Particularly described herein is the use of a laser cladding process for the localized treatment of functional portions of the vane, namely surface areas of the vane shaft. This may be accomplished by applying a suitable rotationally high-speed, fully-automated laser cladding process with cladding materials that are more wear resistant than the typical alloys that are used to form the vane. The cladding materials exhibit adequate adhesion with the typical (less expensive) base vane alloys, such as the above-noted stainless steel alloys or nickel-based superalloys, or the like, from which the rest of the vane is made. A minimum required thickness of the cladding material layer, in order to achieve a high-quality, pore-free, and crack-free treatment of the defined functional area of the vane shaft, may be from about 20 μm to about 500 μm, as deposited, such as from about 20 μm to about 200 μm, as deposited, on the surface of the defined areas of the shaft. As benefit over the prior art, this surface treatment via laser cladding protects the critical vane shaft zones against tribological wear and does not alter the vane geometry. As such, the present disclosure provides a treatment limited to the critical surface areas of the vane shaft to improve wear resistance at high temperatures and avoid defects on these stressed areas of the vane shaft, at a reduced cost as compared with using specialty materials for the entire vane.

Figure 1:
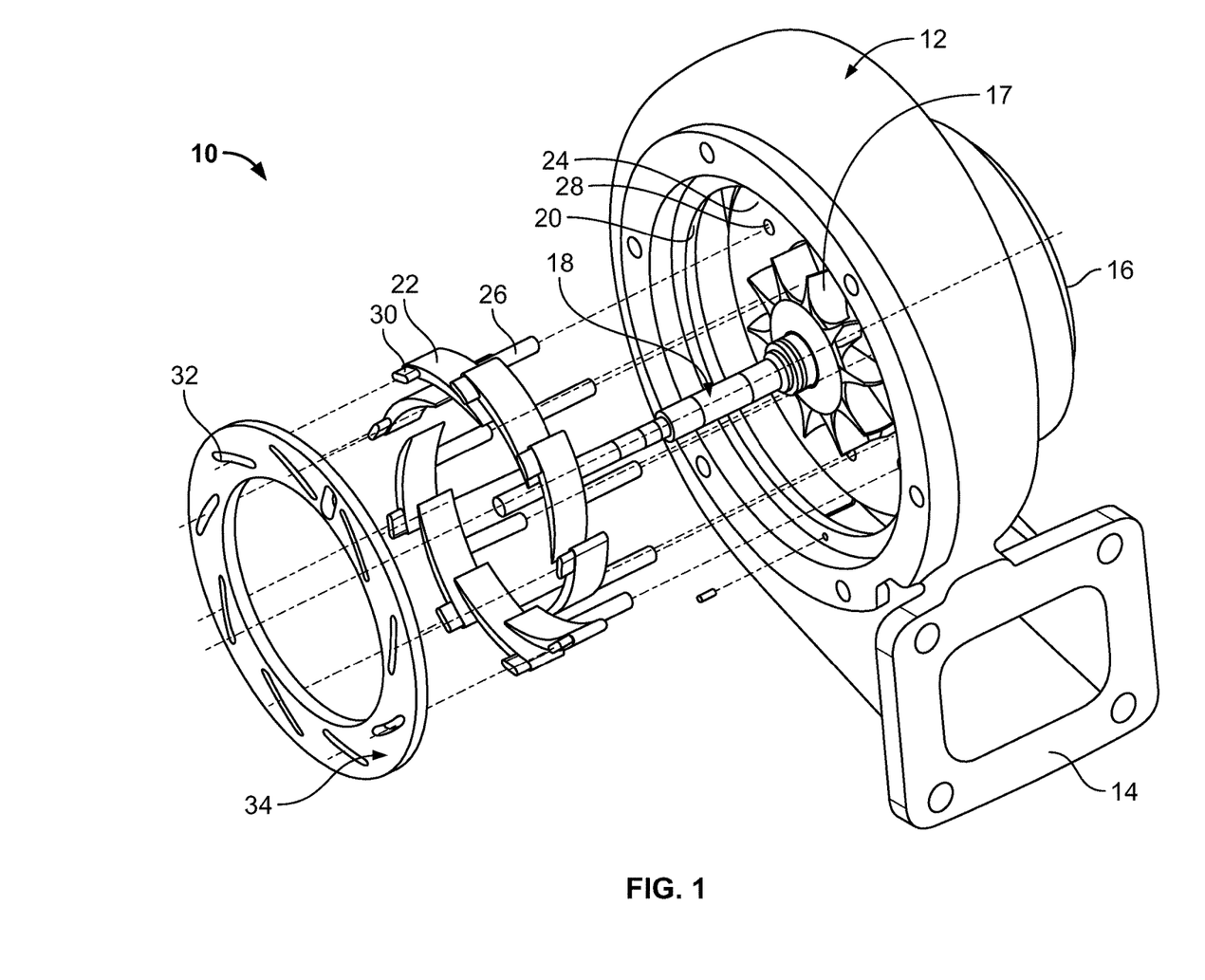
FIG. 1 is an exploded isometric view of a turbine housing for a variable geometry turbocharger employing moveable vanes, in accordance with some embodiments of the present disclosure.

FIG. 1 illustrates a portion of a VGT 10 including a turbine housing 12 having a standard inlet 14 for receiving an exhaust gas stream, and an outlet 16 for directing exhaust gas to the exhaust system of the engine. A volute is connected to the exhaust inlet and an integral outer nozzle wall is incorporated in the turbine housing casting adjacent the volute. A turbine wheel 17 and shaft assembly 18 is carried within the turbine housing 12. Exhaust gas, or other high energy gas supplying the turbocharger, enters the turbine housing 12 through the inlet 14 and is distributed through the volute in the turbine housing 12 for substantially radial delivery to the turbine wheel through a circumferential nozzle entry 20.

Multiple vanes 22 are mounted to a nozzle wall 24 machined into the turbine housing 12 using shafts 26 that project perpendicularly outwardly from the vanes. The vanes 22 used in such a VGTs are generally slim and in an airfoil configuration. The shafts 26 are rotationally engaged within respective openings 28 in the nozzle wall. The vanes 22 each include actuation tabs 30 that project from a side opposite the shafts and that are engaged by respective slots 32 in a unison ring 34, which acts as a second nozzle wall.

An actuator assembly (not shown) is connected with the unison ring 34 and is configured to rotate the ring in one directed or the other as necessary to move the vanes radially outwardly or inwardly to respectively increase or decrease the amount of exhaust gas flow to the turbine. As the unison ring is rotated, the vane tabs 30 are caused to move within their respective slot 32 from one slot end to an opposite slot end. Since the slots are oriented radially along the unison ring, the movement of the vane tabs 30 within the respective slots 32 causes the vanes to pivot via rotation of the vane shafts within their respective openings and move radially outwardly or inwardly depending on the unison ring rotational direction.

Figure 2:
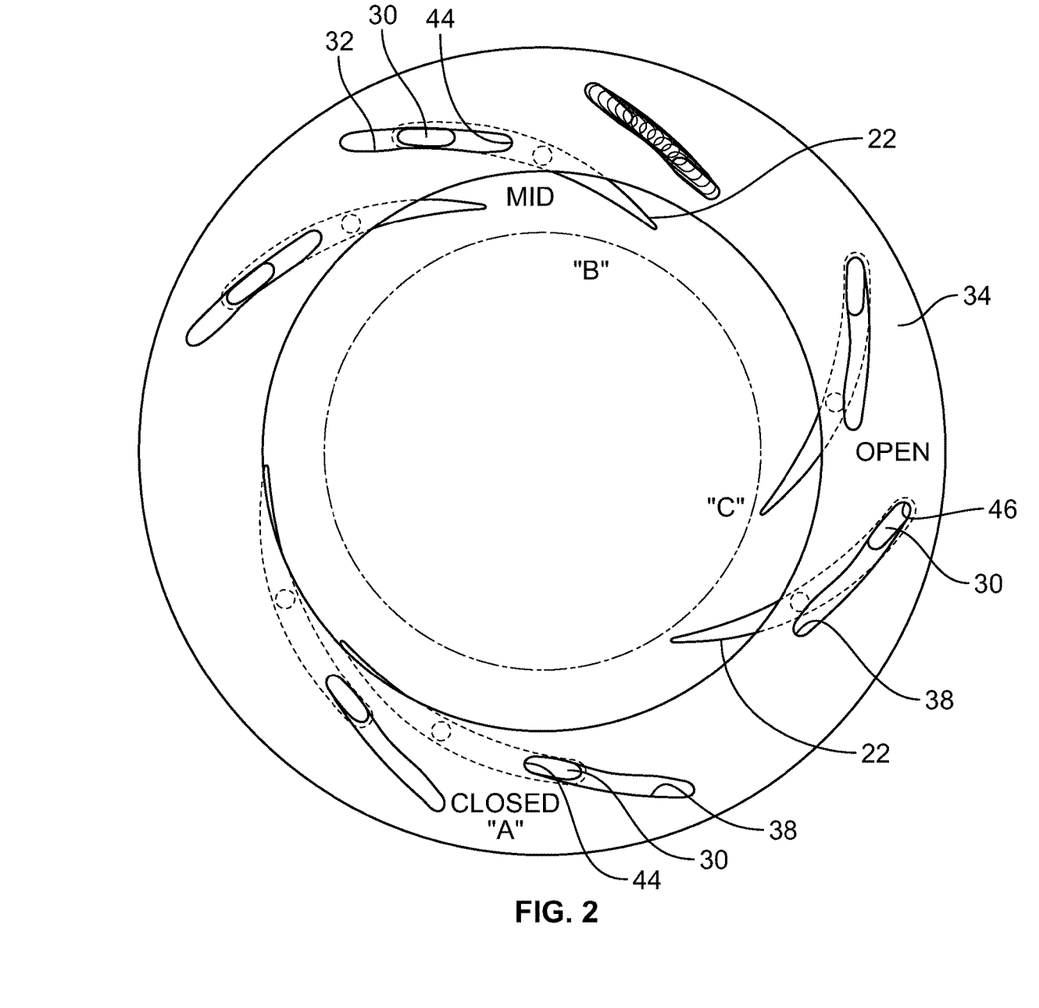
FIG. 2 is a top view of a unison ring of the turbocharger of FIG. 1 showing vanes in different vane operating positions, in accordance with some embodiments of the present disclosure.

FIG. 2 illustrates the general movement pattern of vanes 22, as used in the VGT 10 described and illustrated above in FIG. 1, when actuated by the unison ring. Each vane tab 30 is disposed within a respective slot 32 of a unison ring 34. In a closed position "A", the vane tab 30 is positioned adjacent a first end 44 of the slot 32. This position is referred to as a closed position because the vane is not flared radially outward, thereby serving to limit the flow of exhaust gas to the turbine. At an intermediate position "B", the unison ring 34 has been rotated a sufficient amount such that the vane tab 30 is moved within the slot 32 away from the first slot end 44 towards a middle position of the slot.

The vane tab 30 movement is provided by the pivoting action of the vane relative to the nozzle wall, allowing the vane 22 to be rotated radially outwardly a given extent. At position "B", the intermediate radial projection of the vane 22 serves to increase the flow of exhaust gas to the turbine when compared to closed position "A". At position "C", the unison ring 34 has now been rotated to a maximum position, causing the vane tab 30 to be moved within the slot 32 to a second end 46. Again, such further vane movement is facilitated by the pivoting arrangement between the vane 22 and the nozzle wall 24, allowing the vane 22 to be rotated radially outwardly to a maximum position. At position "C," the maximum radial projection of the vane 22 serves to increase the flow of exhaust gas to the turbine when compared to the intermediate position "A".

Figure 3:
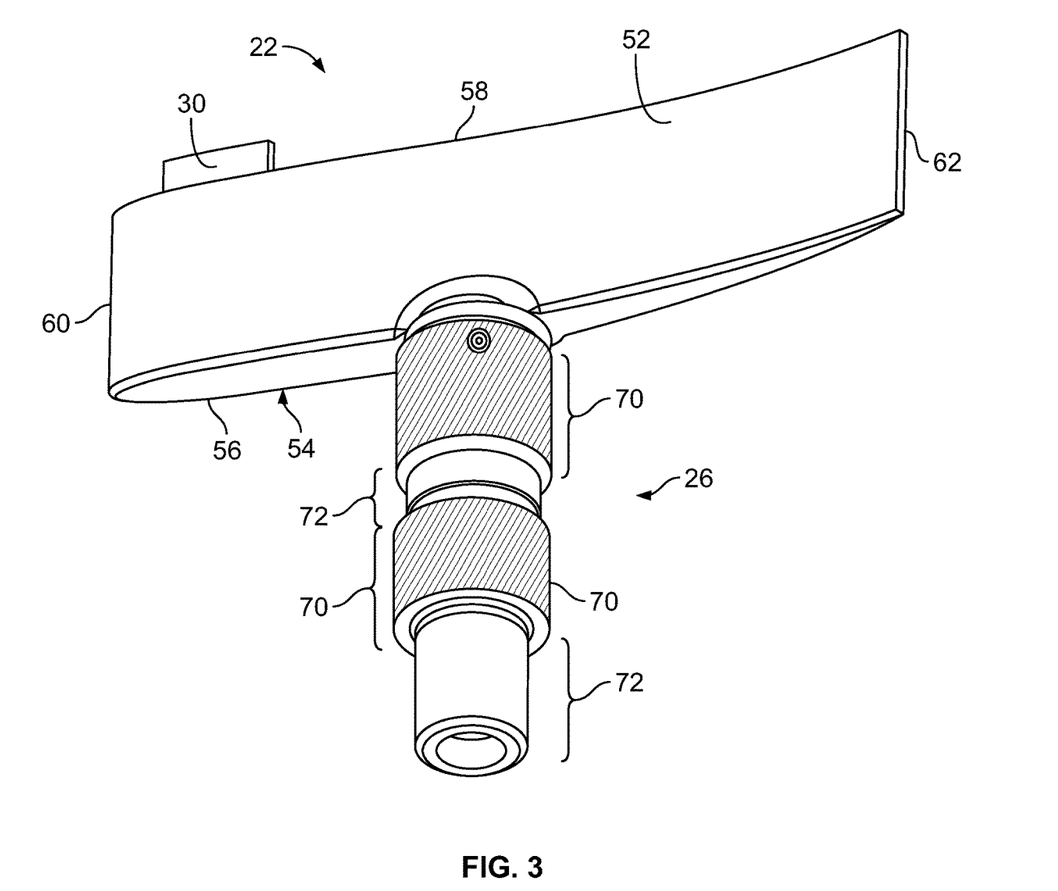
FIG. 3 is a detailed view of the vanes shown in FIG. 2, in accordance with some embodiments of the present disclosure.

FIG. 3 is an enlarged view of an exemplary vane 22 that includes an inner radial surface 52, an opposite outer radial surface 54, and axial surfaces 56 and 58. These vane surfaces are defined relative to the vane placement within the turbine housing 12. Surfaces 52, 54, 56, and 58 define an airfoil configuration (flag), which may be considered a structural portion of the vane 22. The vane 22 includes a leading edge or nose 60 and a trailing edge 62 at opposite common ends of the inner and outer radial surface 52 and 54. As used herein, the term leading edge is used to refer to a rounded nose portion of the vane 22, and is not intended to a sharp or abruptly angled surface feature. The vane 22 includes tab 30 projecting outwardly away from the axial surface 58 and positioned adjacent the leading edge 60, which tab 30 is configured to cooperate with the unison ring slot 32 in the manner described above to facilitate vane actuation. Shaft 26 includes enlarged diameter sections 70, which is sized and configured to provide a secure pressed fit attachment within the openings 28. Adjacent to the enlarged diameter sections 70 are recessed diameter sections 72. Of course, in alternative embodiments, shaft 26 may have a constant or substantially constant diameter. Shaft 26, in either embodiment, may have a largest diameter of about 10 mm or less. Shaft 26 may be considered a functional portion of the vane 22.

Vanes 22 may be manufactured using a metallic material that exhibits good strength, machinability, and high temperatures oxidation and wear resistance. In some embodiments, vanes 22 may be manufactured using a stainless steel material. Stainless steel is an iron based alloy that includes at least 11% chromium, along with one or more other alloying elements such as carbon, nitrogen, aluminum, silicon, sulfur, titanium, nickel, copper, selenium, niobium, and molybdenum, for example. Stainless steels may be austenitic, ferritic, or martensitic. In some embodiments, austenitic stainless steels may be employed for the manufacture of vanes 22, due to their high temperature properties and ease of machining. As noted above, other alloys may also be suitably employed, such as nickel-based superalloys, for example. The vanes 22 may be fabricated using casting, metal injection molding, additive manufacturing, or other known processes.

Referring back to FIG. 3, as illustrated, the surface of sections of the functional shaft 26, namely enlarged diameter sections 70, are composed of a different material than the remainder of vane 22 (i.e., the recessed diameter sections 72 and the structural surfaces of the airfoil (flag) 52, 54, 56, 58). This may be accomplished by applying a suitable rotationally high-speed, fully-automated laser cladding process with cladding materials that are more wear resistant than the typical alloys that are used to form the vane 22. In the embodiments where the shaft 26 has a constant or substantially constant diameter, the different material may be present at the surface of the entire shaft 26. The cladding materials exhibit adequate adhesion with the typical (less expensive) base vane alloys, such as the stainless steel alloys or nickel-based superalloys as described above, or the like, from which the rest of the vane 22 is made. For example, where a stainless steel alloy (illustrative example of which is HK 30) is employed as the base alloy, higher temperature nickel-based superalloys or enhanced nickel-based superalloys (illustrative examples of which are Inconel 601 or Inconel 713, respectively) may be used as the cladding material. In another example, where a nickel-based superalloy (illustrate example of which is Inconel 601) is employed as the base alloy, a further higher temperature, enhanced nickel-based superalloy (illustrative examples of which are Inconel 713 or 718 (suitable for use at temperatures up to about 1050° C.)), may be used as the cladding material. Of course, other combinations of alloys are suitable as well. In general, the base alloy and the cladding alloy may be selected such that the cladding alloy has a temperature specification of about 10° C. to about 100° C. higher than that of the base alloy, such as from about 20° C. to about 70° C. higher. As used herein, the term "temperature specification" is used to indicate that the referenced material has at least one improved mechanical function property at the higher temperature, non-limiting examples of which include: thermo-mechanical properties, wear resistance, hardness, coefficient of friction, oxidation resistance. A minimum required thickness of the cladding material layer, in order to achieve a high-quality, pore-free, and crack-free treatment of the defined functional area of the vane shaft 26, namely sections 70, may be from about 20 μm to about 500 μm, as deposited (such as from about 20 μm to about 200 μm, for example from about 20 μm to about 100 μm, such as from about 20 μm to about 50 μm), on the surface of the defined areas (70) of the shaft 26.

Laser cladding is a method of depositing material by which a powdered or wire feedstock material is melted and consolidated by use of a laser in order to coat part of a substrate. The powder used in laser cladding is injected into the system by either coaxial or lateral nozzles. The interaction of the metallic powder stream and the laser causes melting to occur, and is known as the melt pool. This is deposited onto a substrate; moving the substrate allows the melt pool to solidify and thus produces a track of solid metal. The motion of the substrate is guided by a CAD system, which interpolates solid objects into a set of tracks, thus producing the desired part at the end of the trajectory.

Figure 4:
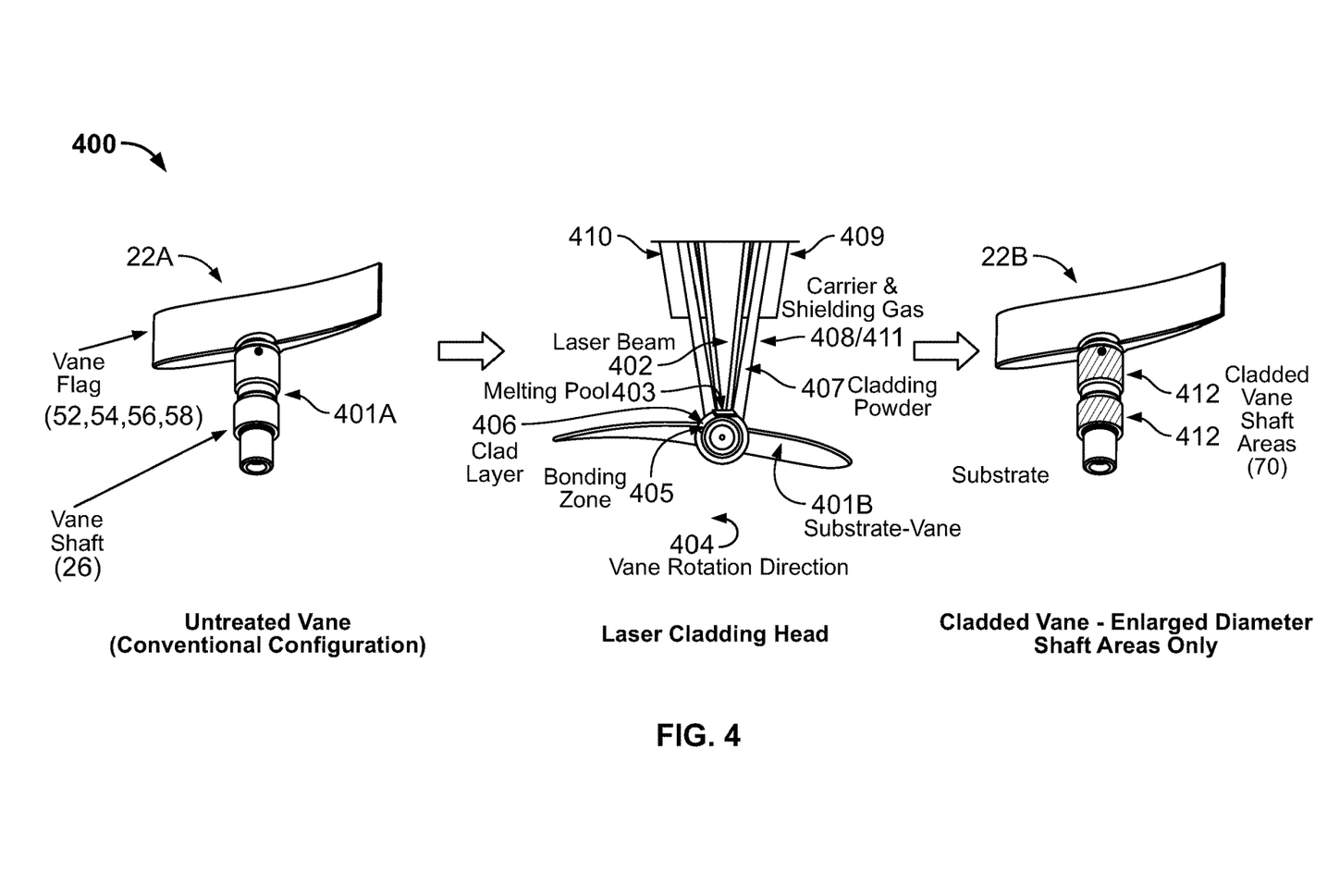
FIG. 4. illustrates a laser cladding arrangement, suitable for use in accordance with some embodiments of the present disclosure.

Reference is now made to FIG. 4, which illustrates a suitable laser cladding arrangement 400 for use in accordance with embodiments of the present disclosure. Arrangement 400 begins at reference numeral 401A, which includes providing or obtaining an untreated vane (22A) made only with the base alloy, for example a stainless steel alloy or a nickel-based superalloy, as described above). As shown at reference numeral 401B, the vane 22A ("Substrate") is placed into a laser cladding apparatus. At reference numeral 402, a laser beam is activated and directed at the substrate. Thereafter, at reference numeral 403, the activated laser beam causes a melt pool to form on the substrate. The substrate, as the laser beam is activated, is rotating at high-speed about an axis through the center of the vane shaft, as indicated at reference numeral 404. The shape of the laser beam is controlled by the optics of a focusing mirror (or lens), and the beam area may be adjusted by varying the working distance between the focusing device and the surface of the substrate. For example, the laser beam may be perpendicular or lateral to the substrate surface (i.e., the defined area (70) of the vane shaft). Suitable parameters of the laser operation that may be adjusted within the level of skill of a person ordinarily skilled in the art may include spot size, intensity, wavelength, laser power, scan speed, feeding rate, and powder preheating. These parameters influence the extent of the heat affected zone (HAZ) and the bonding zone (reference numeral 405), which has impact on the final quality of the clad layer (reference numeral 406)

With continued reference to FIG. 4, as shown at reference numeral 407, cladding material in form of a preheated powder, which bonds with the melt, is supplied by carrier gas (reference numeral 408), through a powder feeding system (reference numeral 409). The laser cladding apparatus includes a robotic system that ensures relative movement of the vane 22A and the laser beam. For example, the substrate may be clamped to a dedicated fixture, which covers the vane flag, and rotates (at high speed) as well as moves linearly relative to the stationary laser-powder delivery system (reference numeral 410). As such, the laser cladding process includes rotating the VGT vane at a high speed (such speeds being known and used by laser cladding machinery in the art), and a high-speed rotary clamping fixture (i.e., a fixture that clamps to and stabilizes the flag portion during high-speed rotation about an axis passing through the shaft) is provided over the flag portion prior to rotating the VGT vane at the high speed in order to protect the flag portion and prevent any damage to the flag portion (not separately shown for clarity of illustration). Together with the carrier gas, a shielding gas (reference numeral 411) such as helium, argon, nitrogen, etc. is delivered to the cladding zone to protect the melting pool from the atmosphere, which could otherwise possibly result in oxidation.

As a result, as shown at reference numeral 412, the vane shaft sections 70 have a clad layer, as described above, with a higher hardness and wear resistance at elevated temperatures. More particularly, provided is a variable geometry turbocharger vane (22B) including a structural, airfoil-shaped flag portion, and a functional, cylindrically-shaped shaft portion connected to the flag portion. The flag portion and the shaft portion are formed of a first metal alloy, and the shaft portion further includes a surface area formed of a second metal alloy different from the first metal alloy.

Figure 5:
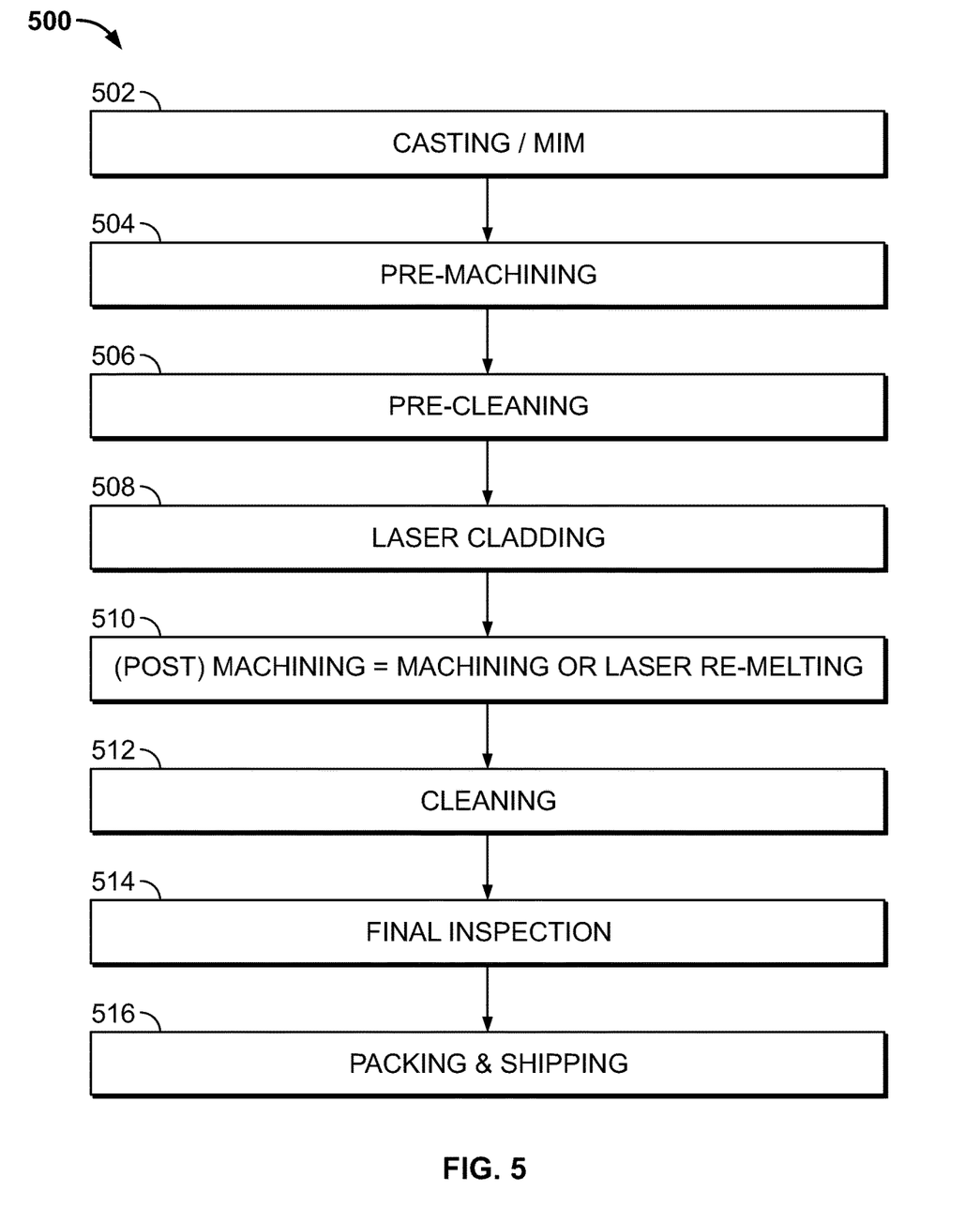
FIG. 5 is a flowchart illustrating a method for manufacturing a VGT vane, in accordance with some embodiments of the present disclosure.

FIG. 5 is a flowchart illustrating a method 500 for manufacturing a VGT vane in accordance with the present disclosure. Method 500 includes various steps that relate to providing or obtaining an untreated VGT vane. The untreated VGT vane includes a structural, airfoil-shaped flag portion, and a functional, cylindrically-shaped shaft portion connected to the flag portion. The flag portion and the shaft portion are formed of a first metal alloy. The method 500 further includes various steps related to subjecting the shaft portion to a laser cladding process using a second metal alloy different from the first metal alloy, thereby forming a surface area of the second metal on the shaft portion.

More specifically, method 500 may begin at step 502 wherein the VGT vane is initially manufactured, for example using casting or metal injection molding (MIM) techniques. Then, at step 504, an optional step, which need not be performed in all embodiments, of pre-machining, in the event that certain features of the design were not included in step 502, or to more closely achieve desired tolerances. Thereafter, at step 506, the VGT vane is pre-cleaned, using for example a suitable solvent or other conventional cleaning method. Then, at step 508 the laser cladding process is performed, as described above. Subsequent to the laser cladding process, an optional post-machining step 510, which need to be performed in all embodiments, may be accomplished. If employed, step 508 may be performed using conventional machining techniques, or preferably, may be performed using laser re-melting. Laser re-melting may be done with one process step, and using the same laser as in step 508. Thereafter, a post-cleaning process may be performed at step 512, in the manner described above with regard to step 506. The method 500 concludes with a final inspection step 514 and a packing and shipping step 516.

Accordingly, the present disclosure has provided bi-metal variable geometry turbocharger vanes and methods for manufacturing bi-metal turbocharger vanes using laser cladding techniques. The methods have provided for the use of a laser cladding process for the localized treatment of functional portions of the vane, namely surface areas of the vane shaft. This has been accomplished by applying a suitable rotationally high-speed, fully-automated laser cladding process with cladding materials that are more wear resistant than the typical (less expensive) alloys that are used to form the vane. The cladding materials exhibit adequate adhesion with the typical base vane alloys, and they achieve a high-quality, pore-free, and crack-free treatment of the defined functional area of the vane shaft. As benefit over the prior art, this surface treatment via laser cladding protects the critical vane shaft zones against tribological wear and does not alter the vane geometry. As such, the present disclosure has provided a treatment limited to the critical surface areas of the vane shaft to improve wear resistance at high temperatures and avoid defects on these stressed areas of the vane shaft, at a reduced cost as compared with using specialty materials for the entire vane.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A bi-metal variable geometry turbocharger (VGT) vane comprising:
   a structural, airfoil-shaped flag portion; and
   a functional, cylindrically-shaped shaft portion connected to the flag portion,
   wherein the flag portion and the shaft portion are formed of a first metal alloy, and wherein a circumferential surface of the shaft portion further comprises a surface area formed of a second metal alloy different from the first metal alloy, wherein the second metal alloy comprises a second nickel-based alloy, and wherein the surface area formed of the second metal alloy has a thickness of from about 20 μm to about 500 μm, and wherein the remainder of the VGT vane is free of the second metal alloy.

2. The VGT vane of claim 1, wherein the shaft portion comprises a first section having an enlarged diameter and a second section having a recessed diameter, and wherein the surface area formed of the second metal alloy is present at the first section but not the second section; or
   wherein the shaft portion comprises a constant or substantially constant diameter, and wherein the surface area formed of the second metal alloy is present along an entirety of the shaft portion.

3. The VGT vane of claim 1, wherein a diameter of the shaft portion is about 10 mm or less.

4. The VGT vane of claim 1, wherein the surface area formed of the second metal alloy has a thickness of from 20 µm to about 200 µm.

5. The VGT vane of claim 1, wherein a diameter of the shaft portion is about 10 mm or less, and wherein the surface area formed of the second metal alloy has a thickness of from about 20 µm to about 100 µm.

6. The VGT vane of claim 1, wherein the surface area formed of the second metal alloy is formed using a laser cladding process.

7. The VGT vane of claim 1, wherein the first metal alloy comprises a stainless steel alloy or a first nickel-based alloy.

8. The VGT vane of claim 1, wherein the second nickel-based alloy has at least one improved mechanical functional property at higher temperatures than the first metal alloy.

9. A variable geometry turbocharger comprising the bi-metal VGT vane of claim 1.

10. A method for manufacturing a bi-metal variable geometry turbocharger (VGT) vane comprising:
   providing or obtaining an untreated VGT vane, the untreated VGT vane comprising a structural, airfoil-shaped flag portion, and a functional, cylindrically-shaped shaft portion connected to the flag portion, wherein the flag portion and the shaft portion are formed of a first metal alloy; and
   subjecting the shaft portion to a laser cladding process using a second metal alloy different from the first metal alloy, thereby forming a surface area of the second metal alloy on a circumferential surface of the shaft portion, wherein the second metal alloy comprises a second nickel-based alloy, and wherein the surface area formed of the second metal alloy has a thickness of from about 20 µm to about 500 µm, and wherein the remainder of the VGT vane is free of the second metal alloy.

11. The method of claim 10, wherein the shaft portion comprises a first section having an enlarged diameter and a second section having a recessed diameter, and wherein the method comprises forming the surface area of the second metal alloy at the first section but not the second section; or
   wherein the shaft portion comprises a constant or substantially constant diameter, and wherein the method comprises forming the surface area of the second metal alloy along an entirety of the shaft portion.

12. The method of claim 10, wherein a diameter of the shaft portion is about 10 mm or less.

13. The method of claim 10, wherein the surface area formed of the second metal alloy has a thickness of from 20 µm to about 200 µm.

14. The method of claim 10, wherein a diameter of the shaft portion is about 10 mm or less, and wherein the surface area formed of the second metal alloy has a thickness of from about 20 µm to about 100 µm.

15. The method of claim 10, wherein the first metal alloy comprises a stainless steel alloy or a first nickel-based alloy.

16. The method of claim 15, wherein the second nickel-based alloy has at least one improved mechanical functional property at higher temperatures than the first metal alloy.

17. The method of claim 10, wherein the step of subjecting the shaft portion to the laser cladding process comprises rotating the VGT vane at a high speed, and wherein the method further comprises providing a high-speed rotary clamping fixture covering the flag portion prior to rotating the VGT vane at the high speed.

18. The method of claim 10, further comprising installing the bi-metal VGT vane in a variable geometry turbocharger.

19. The method of claim 10, further comprising performing a post-machining step of laser re-melting, subsequent to the step of subjecting the shaft portion to the laser cladding process.

\* \* \* \* \*